US012273606B2

(12) United States Patent
Babon et al.

(10) Patent No.: US 12,273,606 B2
(45) Date of Patent: Apr. 8, 2025

(54) DEVICE AND METHOD FOR CAPTURING IMAGES OR VIDEO

(71) Applicant: InterDigital CE Patent Holdings, Paris (FR)

(72) Inventors: Frederic Babon, Chateaubourg (FR); Tristan Langlois, Chateaugiron (FR); Guillaume Boisson, Pleumeleuc (FR); Didier Doyen, Cesson-sévigné (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 17/799,501

(22) PCT Filed: Feb. 3, 2021

(86) PCT No.: PCT/EP2021/052539
§ 371 (c)(1),
(2) Date: Aug. 12, 2022

(87) PCT Pub. No.: WO2021/160489
PCT Pub. Date: Aug. 19, 2021

(65) Prior Publication Data
US 2023/0088309 A1     Mar. 23, 2023

(30) Foreign Application Priority Data

Feb. 14, 2020   (EP) .................................... 20305142

(51) Int. Cl.
*H04N 23/45*     (2023.01)
*H04N 5/262*     (2006.01)
(52) U.S. Cl.
CPC ........... *H04N 23/45* (2023.01); *H04N 5/2628* (2013.01)
(58) Field of Classification Search
CPC ..... H04N 23/45; H04N 5/2628; H04N 23/951
See application file for complete search history.

(56) References Cited

U.S. PATENT DOCUMENTS 8,189,100 B2   5/2012  Li et al.
8,988,509 B1   3/2015  Macmillan et al.
(Continued)

OTHER PUBLICATIONS

Zhang et al., "A Flexible New Technique for Camera Calibration", Microsoft Corporation, Microsoft Research, Technical Report, Document: MSR-TR-98-71, Dec. 2, 1998, 22 pages.
Anonymous, "Photosynth", Wikipedia article, Jan. 24, 2020, 5 pages.
(Continued)

*Primary Examiner* — Hung H Lam
(74) *Attorney, Agent, or Firm* — Volpe Koenig

(57) ABSTRACT

A device includes at least one first sensor and at least one second sensor for capturing first image data, the at least one first and second sensors being rectangular and arranged orthogonal to the at least one first rectangular sensor, and at least one hardware processor configured to cause the at least one first and second sensors, respectively, the first image data and the second image data at least substantially simultaneously, and at least one of display simultaneously data from the first image data and data from the second image data as a cross-shaped image or store together data from the first image data and data from the second image data as a cross-shaped image. The resulting first and second image data can be stored in a single file in memory. The at least one hardware processor can be processed to remove redundancies between the image data. The device can also extract from the first and second image data, image data corresponding to a rectangle parallel with an horizon.

16 Claims, 7 Drawing Sheets

(56) References Cited

U.S. PATENT DOCUMENTS

| | | | |
|---|---|---|---|
| 9,723,212 B2 | 8/2017 | Chukka et al. | |
| 10,313,656 B2 | 6/2019 | Sadi et al. | |
| 2011/0043669 A1* | 2/2011 | Ishida | H04N 23/90 |
| | | | 348/E5.048 |
| 2011/0234640 A1* | 9/2011 | Ishida | H04N 23/611 |
| | | | 345/671 |
| 2012/0287315 A1* | 11/2012 | Huang | H04N 23/57 |
| | | | 348/262 |
| 2013/0258129 A1 | 10/2013 | Burns | |
| 2014/0160231 A1* | 6/2014 | Middleton | H04N 23/45 |
| | | | 348/36 |
| 2014/0320725 A1 | 10/2014 | Chun et al. | |
| 2015/0036944 A1* | 2/2015 | Restrepo | G06T 5/20 |
| | | | 382/296 |
| 2015/0281583 A1* | 10/2015 | Chukka | H04N 23/667 |
| | | | 348/333.12 |
| 2016/0381345 A1* | 12/2016 | Wu | H04N 13/246 |
| | | | 348/36 |
| 2017/0023492 A1* | 1/2017 | Olsson | H04N 23/58 |
| 2019/0121216 A1* | 4/2019 | Shabtay | G03B 3/06 |
| 2020/0045214 A1* | 2/2020 | Zhou | H04N 23/57 |

OTHER PUBLICATIONS

Bouguet, Jean-Yves, "Camera Calibration Toolbox for Matlab", CaltechDATA, Version 1.0, Url: https://doi.org/10.22002/D1.20164, Oct. 14, 2014, 4 pages.

Alagha et al., "Extensible Device Metadata XDM Specification, Version 1.0", XDM Working Group, Oct. 26, 2015, 35 pages.

* cited by examiner

DEVICE AND METHOD FOR CAPTURING IMAGES OR VIDEO

CROSS REFERENCE TO RELATED APPLICATIONS

This application is a U.S. National Stage Application under 35 U.S.C. 371 of International Patent Application No. PCT/EP2021/052539, filed Feb. 3, 2021, which is incorporated herein by reference in its entirety.

This application claims the benefit of European Application No. 20305142.0, filed Feb. 14, 2020.

TECHNICAL FIELD

The present disclosure relates generally to digital photography and in particular to photography using handheld devices such as smartphones and tablets.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Presently, when taking pictures or video using a smartphone, the user selects between portrait or landscape formats by rotating the smartphone. A photo in portrait format is not suited for display on a television or other landscape-based display, while, conversely, a photo in landscape format is ill-suited for use as wallpaper on the smartphone and for display on portrait-based displays.

While the user often has enough time to select a suitable mode (e.g. portrait or landscape), it can happen that a photo is taken on the fly due to an unexpected event, in which case the user tends to take the picture holding the smartphone in the most instinctive way, i.e. in portrait mode, because these devices are designed to be held like that in one hand.

In the case of video, most viewing screens are in landscape mode, but people nevertheless often shoot video in portrait mode with their smartphone, ending up with video not particularly suitable for these viewing screens.

As can be seen, users taking pictures or shooting video with smartphones do not always choose the most suitable mode.

It will thus be appreciated that there is a desire for a solution that addresses at least some of the shortcomings related to taking pictures or shooting video with a smartphone. The present principles provide such a solution.

SUMMARY OF DISCLOSURE

In a first aspect, the present principles are directed to a device comprising
at least one first sensor for capturing first image data, the at least one first sensor being rectangular and directed in a direction in relation to the device, at least one second sensor for capturing second image data, the at least one second sensor being rectangular and directed in the direction and further arranged at least essentially orthogonal to the at least one first rectangular sensor, and at least one hardware processor configured to cause the at least one first sensor and the at least one second sensor to capture, respectively, the first image data and the second image data at least substantially simultaneously, and at least one of display simultaneously data from the first image data and data from the second image data as a cross-shaped image or store together data from the first image data and data from the second image data as a cross-shaped image.

In a second aspect, the present principles are directed to a method comprising capturing at least substantially simultaneously first image data by at least one first sensor of a device and second image data by at least one second sensor of the device, the at least one first sensor being rectangular and directed in a direction in relation to the device, and the at least one second sensor being rectangular and directed in the direction and further arranged at least essentially orthogonal to the at least one first rectangular sensor, at least one of displaying simultaneously data from the first image data and data from the second image data as a cross-shaped image or storing together data from the first image data and data from the second image data as a cross-shaped image.

In a third aspect, the present principles are directed to a computer program product which is stored on a non-transitory computer readable medium and includes program code instructions executable by a processor for implementing the steps of a method according to any embodiment of the second aspect.

BRIEF DESCRIPTION OF DRAWINGS

Features of the present principles will now be described, by way of non-limiting example, with reference to the accompanying drawings, in which.

DESCRIPTION OF EMBODIMENTS

Figure 1:
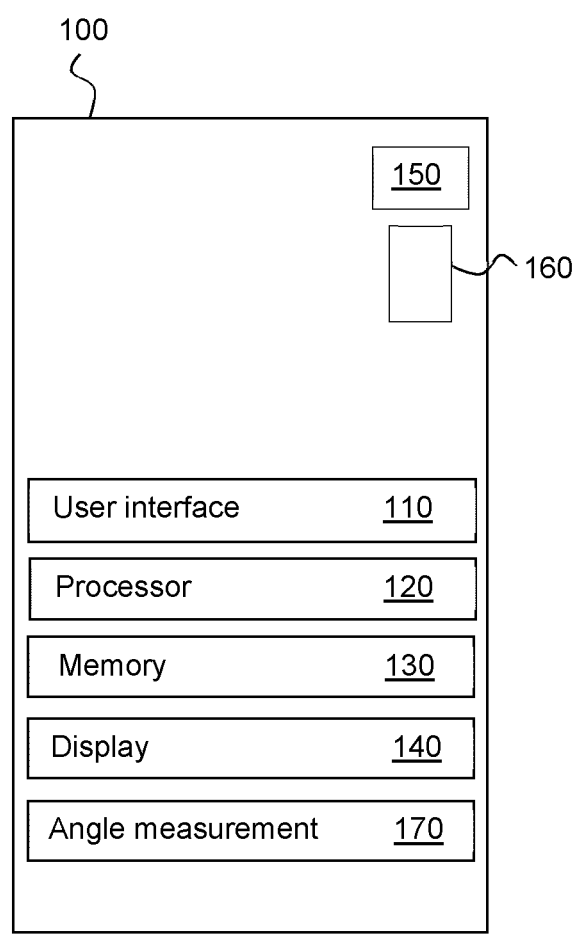
FIG. 1 illustrates a device according to an embodiment of the present principles.

FIG. 1 illustrates a device 100 according to an embodiment of the present principles. In the following, as a non-limiting example, the device 100 will be described as a smartphone, but it will be understood that the device 100 can be implemented as other types of devices, such as a tablet. In addition, where the description mentions images (a.k.a. pictures), this can be extended to include video, which in practice is a set of images.

The smartphone 100 includes at least one user interface 110 configured to receive input, such as instructions and selections, from a user and to provide output to the user. Any suitable user interface can be used, including for example a microphone, a speaker, a haptic actuator, buttons, a keyboard, and a touchscreen.

The smartphone 100 further includes at least one hardware processor 120 ("processor") configured to, among other things, control the smartphone 100, process captured images, and execute program code instructions to perform at least one method of the present principles. The smartphone 100 also includes memory 130 configured to store the program code instructions, execution parameters, image data, and so on.

The smartphone 100 further includes a display 140 configured to output visual information such as images, possibly captured by the smartphone 100. The display 140, which can be a touchscreen, is part of the user interface 110, but is described separately for emphasis.

The smartphone 100 further includes at least one first rectangular sensor ("first sensor") 150 and at least one second rectangular sensor ("second sensor") 160 configured to capture images. The first sensor 150 and the second sensor can have the same aspect ratios (e.g. 4/3 or 16/9), but are oriented to face in the same direction (such as directly outward from the back of the smartphone) and respectively orthogonal or at least essentially orthogonal. Put another way, one sensor can be oriented to capture portraits while the other sensor, possibly otherwise with the same characteristics as the first, is oriented to capture landscapes.

The smartphone 100 further includes an angle measuring unit 170 configured to measure the roll angle, i.e. the inclination of the smartphone in relation to the horizon.

The smartphone 100 can include a plurality of first sensors 150 and a plurality of second sensors 160, preferably but not necessarily the same number, oriented to face the same direction. As is known, in a plurality of sensors, different sensors can have different properties in order to make it possible to provide for example bokeh effects, wide angle capacity, telephoto lens capacity, or improved fine details.

One skilled in the art will understand that a smartphone will include further features such as a power source and radio interfaces; only features related to the present principles are discussed for reasons of brevity and clarity.

When taking a picture, for example in response to user instructions, the processor 120 will cause both the first sensor 150 and the second sensor 160 to take a picture at the same time or at least substantially the same time. The resulting first picture and second picture can be processed before storage, for example in memory 130, or transmission to another device.

The first picture and the second picture can be stored in a single file, for example based on the Extensible Device Metadata (XDM) file format that enables storage of image data from a plurality of cameras (sensors) in a single file. Contrary to the present principles, conventional use of the XDM format, however, appears to require the same pose and same aspect ratio for the images.

Figure 2:
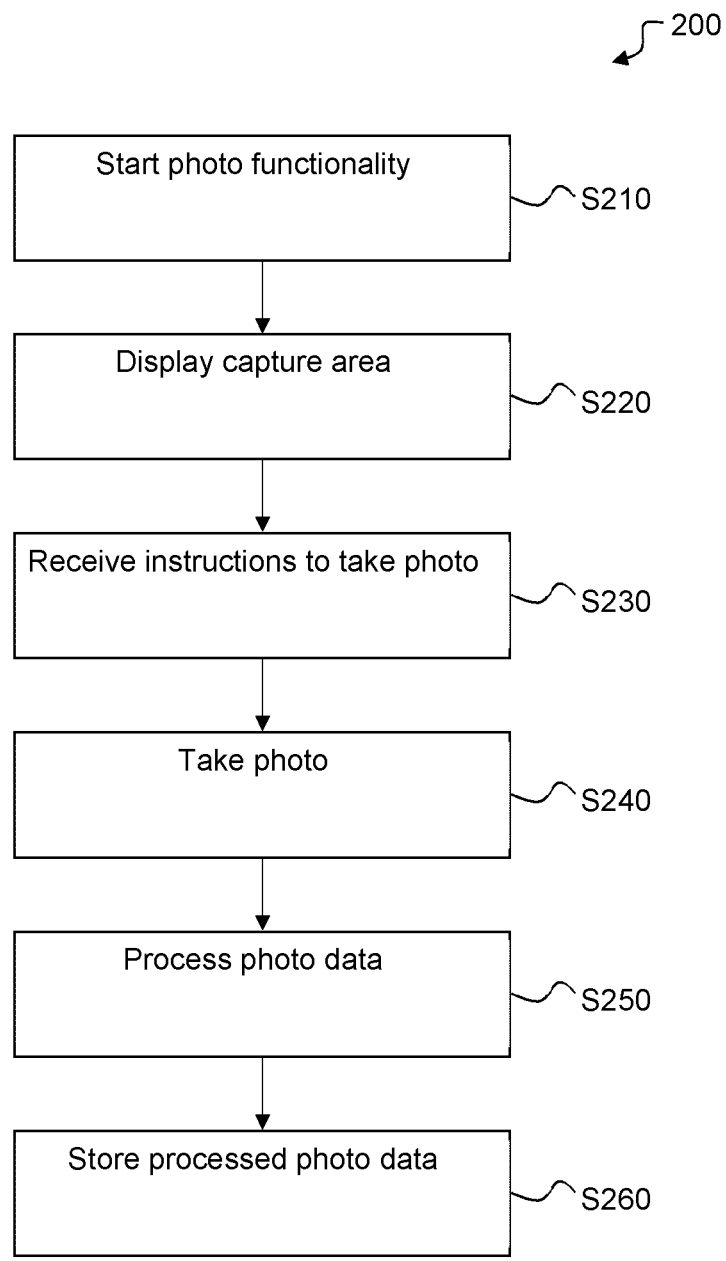
FIG. 2 illustrates a method according to an embodiment of the present principles.

FIG. 2 illustrates a method 200 of an embodiment of the present principles. The method 200 can be performed by a device 100 such as the smartphone in FIG. 1.

In step S210, the device 100 starts its photo application enabling photo functionality. This can for example be done in response to user instructions (e.g. via user interface 110 in FIG. 1), in response to execution of software code or in response to instructions received from an external device.

In step S220, the device 100 displays a capture zone on its display. The capture zone indicates at least essentially what can be captured by the device's first and second sensors. The skilled person will appreciate that this enables the user to aim the device before taking a picture, in order to frame the picture.

Figure 3A:
FIGS. 3A and 3B illustrate examples of capture zones according to embodiments of the present principles.
Figure 3B:
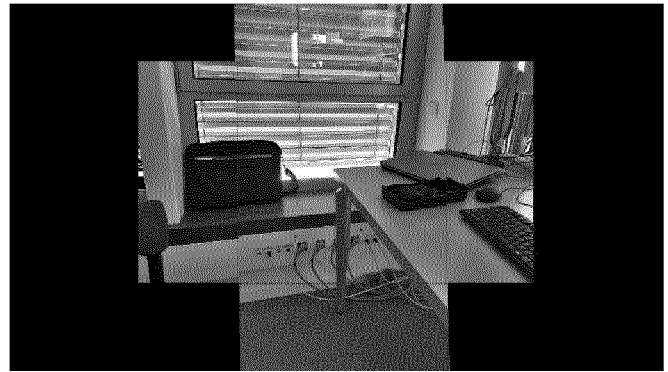

FIGS. 3A and 3B illustrate examples of capture zones on a display of a device according to embodiments of the present principles. FIG. 3A illustrates a first example of a capture zone with a 4/3 aspect ratio displayed on a vertically oriented smartphone. FIG. 3B illustrates a second example of a capture zone with a 16/9 aspect ratio displayed on a horizontally oriented smartphone.

As can be seen in FIGS. 3A and 3B, the capture zone is cross-shaped. Indeed, the capture zone displays what is "seen" by the first sensor and by the second sensor. In an embodiment, the input from the first sensor and the second sensor are processed (as will be explained hereafter) with the goal of providing a seamless stitching of the inputs. In another embodiment, the capture zone shows the input from one of the sensors and the "missing parts" from the input of the other sensor.

In step S230, the device 100 obtains instructions to take a picture. As in step S210, this can for example be user instructions.

In step S240, in response to the instructions, the device 100 captures the input from the first and the second sensor separately.

In step S250, the device 100 processes the captured input from the first and second sensors. This processing will be further described hereafter.

In step S260, the device 100 stores the captured photo, i.e. the processed input. The captured photo can be stored in memory of the device or output to a further device for storage.

As already mentioned, the captured input can be stored in a single file, e.g. using the XDM file format, input from each sensor being associated with a different "camera".

In an embodiment, the processing can include respectively associating the captured input from the sensors with sensor pose information, for example vertical or horizontal.

Figure 4:
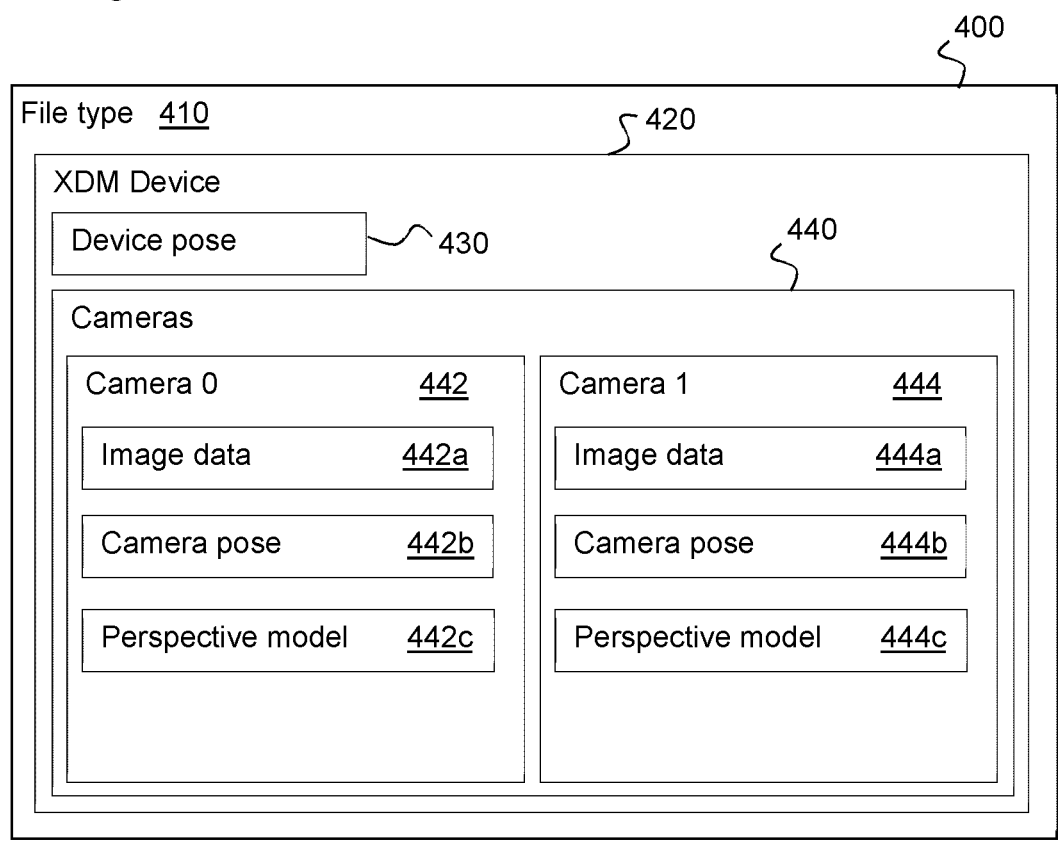
FIG. 4 illustrates an example of a file storing a photo captured using the method illustrated in FIG. 2.

FIG. 4 illustrates an example of a file storing a photo captured using the method illustrated in FIG. 2. In the example, the file format is XDM.

As can be seen, the XDM file 400 includes an indication of file type 410, such as JPEG and GIF, XDM device information 420 including device pose 430 and camera information 440. The camera information 440 can include information relating to a first camera 442 and information relating to a second camera 444.

The information relating to a camera 442, 444 can each correspond to a sensor, e.g. Camera 0 can correspond to the first sensor 150 and Camera 1 to the second sensor 160, or vice versa.

Each information relating to a camera 442, 444 can include processed image data 442a, 444a from the corresponding sensor, information about the camera pose (i.e. sensor pose) 442b, 444b and a perspective model 442c, 444c, i.e. intrinsic parameters of a camera such as for example focal length, principal point for the optical axis, skew, and lens distortion.

Figure 5A:
FIGS. 5A and 5B respectively illustrate examples of displayed processed data corresponding to the sensors.
Figure 5B:

FIGS. 5A and 5B respectively illustrate examples of displayed processed data corresponding to the sensors. FIG. 5A shows a landscape image captured by one sensor and FIG. 5B a portrait image captured by the other sensor.

When displaying the stored photo, the device can show a combined image with data from both sensors combined in any suitable way, only the landscape image or only the portrait image. What the device displays can be preset or selected by a user. The device can display the combined image and then, in response to user instructions, display, store or output one of the two images.

The skilled person will appreciate that the two images contain much redundant information and that the storage requirements thus are greater than needed for at least some applications.

In a further embodiment, the captured data is processed to reduce the size of the resulting file. It is noted that this processing also can be used to provide the seamless stitching mentioned with reference to step S220.

In the further embodiment, since the lenses for the sensors are not the same, captured image data from one sensor is rectified to the referential of the other sensor, resized and then cropped to keep only the additional parts of the captured image data.

Figure 6:
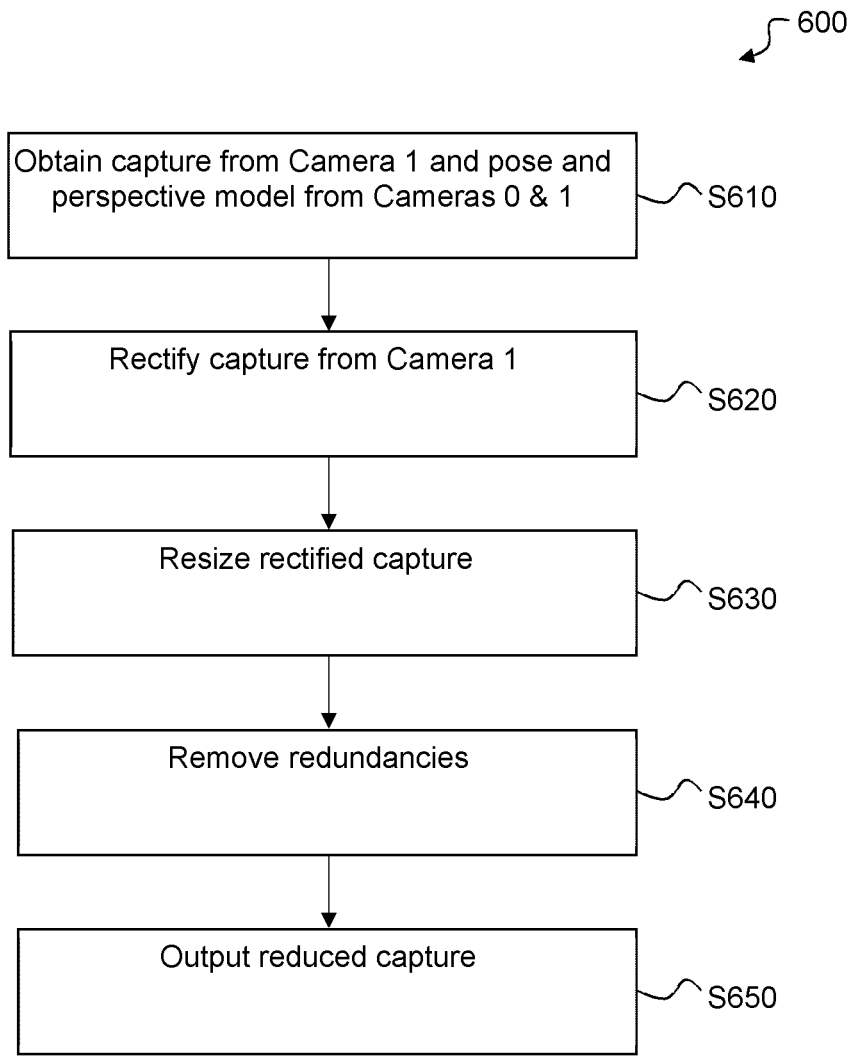
FIG. 6 illustrates a method for processing captured data according to an embodiment.

FIG. 6 illustrates a method for processing captured data according to the further embodiment. In this example, the first camera, Camera 0, is the one that took the landscape picture and the second camera, Camera 1, took the portrait picture, but it can be the other way around.

In step S610, a processor obtains the captured data from Camera 1, the pose and perspective model from Camera 1 and the pose and perspective model from Camera 0.

In step S620, the processor rectifies the captured image data from Camera 1 to the referential of Camera 0, which results in rectified image data. This is a well-known procedure that will not be further described herein as it has been described in for example Z. Zhang, "A Flexible New Technique for Camera Calibration," in *IEEE Transactions on Pattern Analysis and Machine Intelligence*, vol. 22, no. 11, pp. 1330-1334, November 2000. and in J.-Y. Bouguet, Camera Calibration Toolbox for Matlab, http://www.vision.caltech.edu/bouguetycalib_doc/index.html.

In step S630, the processor resizes the rectified image data to match the size of the captured image data from Camera 0, which results in resized image data. This, too, is a well-known procedure.

In step S640, the processor removes the redundant parts of the resized image data, which results in reduced image data. The redundant parts are the ones that may be found in the captured image data from Camera 0, essentially the overlapping parts.

In step S650, the processor outputs the reduced image data, for example for storage in the file.

It is noted that in case it is desired to use image processing techniques that require the captured data from both sensors, such as for example super-resolution imaging, then such image processing should be performed before the captured image data is reduced using the method in FIG. 6.

Figure 7A:
FIGS. 7A and 7B illustrate examples of images corresponding to image data and corresponding reduced data.
Figure 7B:
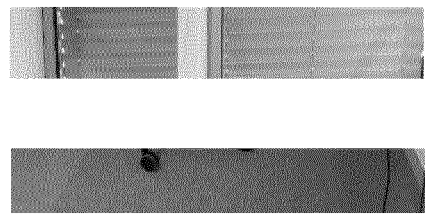

FIGS. 7A and 7B illustrate examples of images corresponding to image data and corresponding reduced data. FIG. 7A illustrates the same landscape image as in FIG. 5A, while FIG. 7B illustrates the additional parts (note that there are two additional parts, one corresponding to the part above the image in 7A, one corresponding to the part below).

Figure 8:
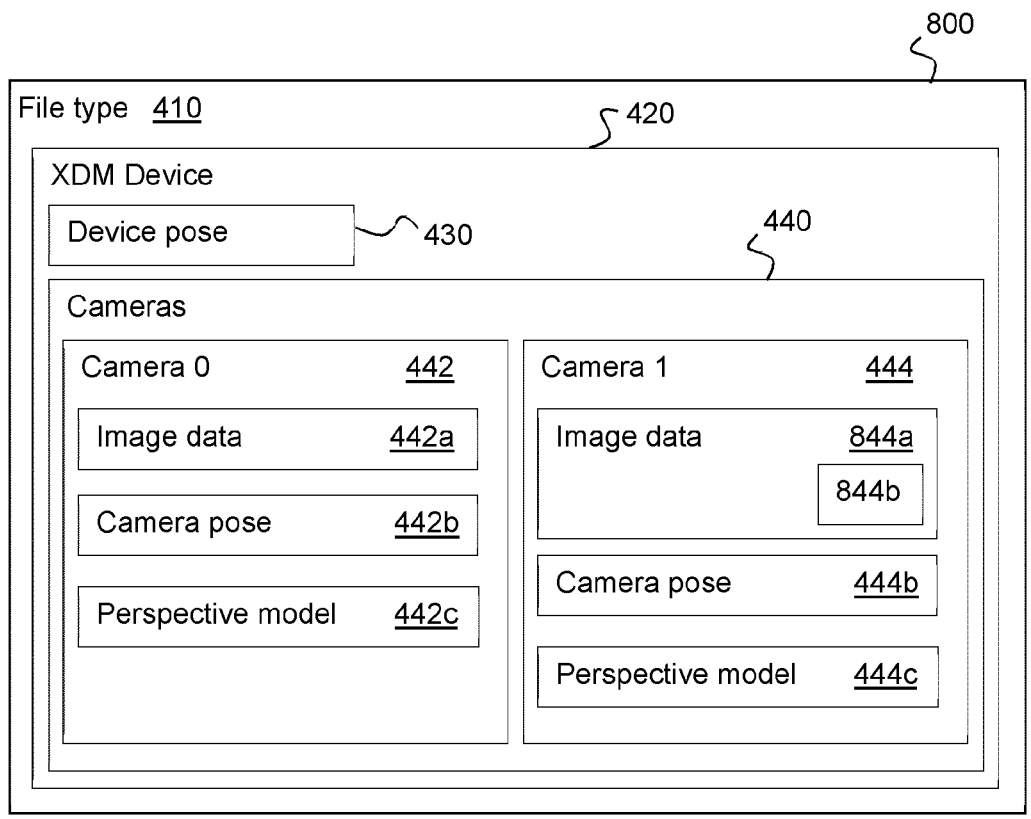
FIG. 8 illustrates an example of a file storing a photo captured using the method illustrated in FIG. 2 and that has been reduced in size.
Figures 10A, 10B, 10C, 10D:
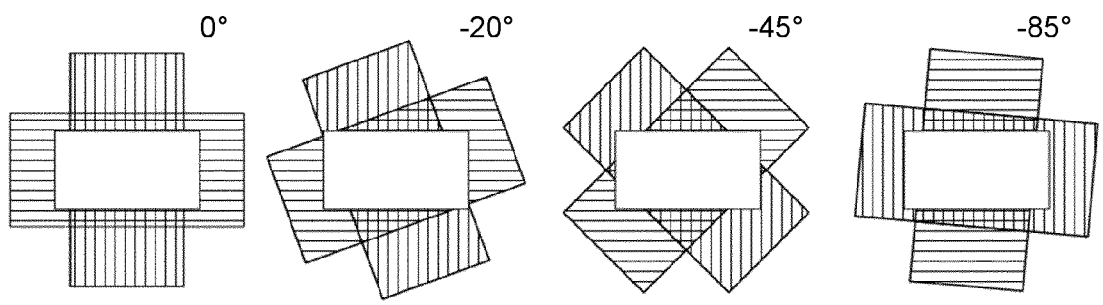
FIGS. 10A-10D illustrate the cropping of the combined video data based on the roll angle in the method of FIG. 9.

FIG. 8 illustrates an example of a file storing a photo captured using the method illustrated in FIG. 2 and that has been reduced in size.

As can be seen, the file 800 bears a significant resemblance to the file 400 in FIG. 4; the same reference numbers are used when the indicated features are the same. A first difference is that the image data 844*a* of Camera 1 844 includes the additional parts, a second difference is that the image data 844*a* is associated with a reduced image data indicator 844*b* that indicates whether or not the file includes reduced image data, i.e. additional parts, to be combined with the image data of Camera 0 before display.

Figure 9:
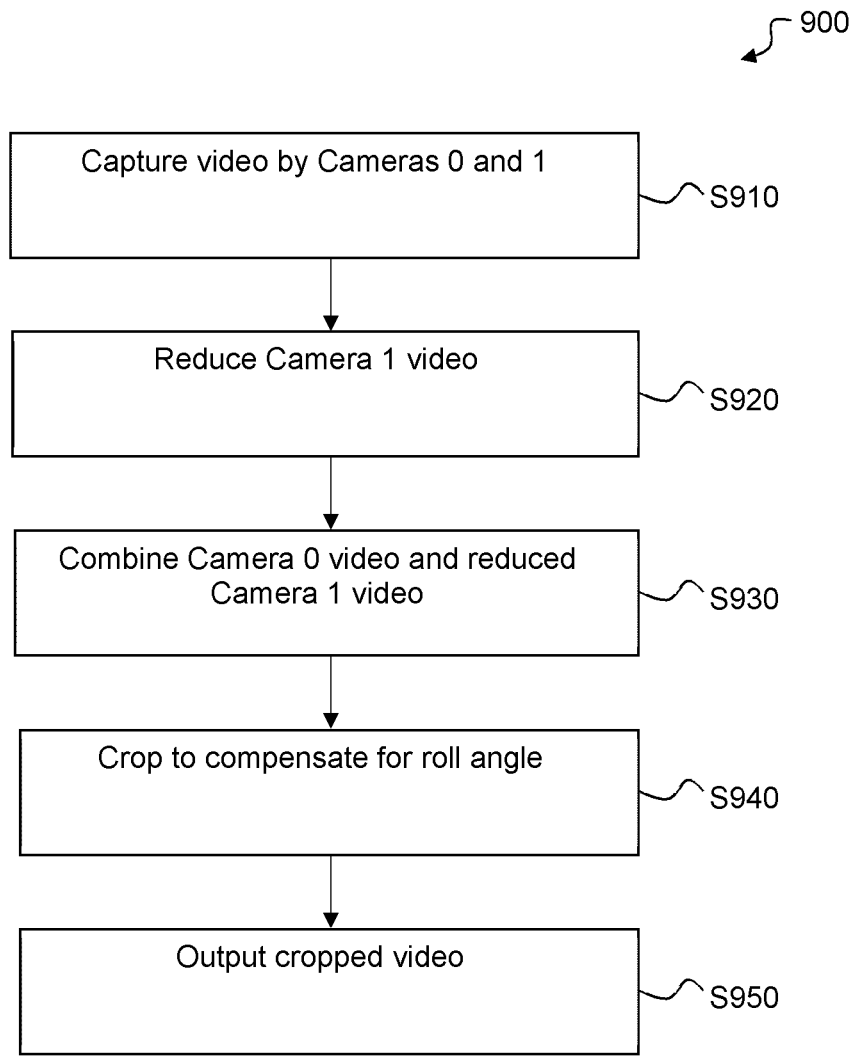
FIG. 9 illustrates a method for capturing video according to an embodiment of the present principles.

FIG. 9 illustrates a method for capturing video according to an embodiment of the present principles. The method can be performed by the device 100 of FIG. 1; the reference numbers in the description of the figure refer to those in FIG. 1. It is noted that the method would typically be implemented as an iterative method processing a captured image at a time.

In step S910, the first sensor 150 and the second sensor 160 capture video, i.e. a series of images.

In step S920, the processor 120 processes the captured video from the second sensor 160 using the method described in FIG. 6, i.e. rectification, resizing and reduction, to generate reduced video data.

In step S930, the processor 120 combines the video from the first sensor 150 with the reduced video data generated in step S920 to generate combined video data.

In step S940, the processor 120 uses a roll angle, e.g. measured by the angle measuring unit 170 of the device 100, to crop the combined video data so that the cropped video data is in the landscape mode parallel or at least essentially parallel to the horizontal.

In step S950, the processor 120 outputs the cropped video data, for example to at least one of the display 140, the memory 130 and an external device.

FIGS. 10A-10D illustrate the cropping of the combined video data based on the roll angle in step S940. The figures are intended to illustrate counterclockwise orientation of the device 100 from the vertical (also indicated by the vertically hashed rectangle) to the near horizontal.

Each figure illustrates the combined video (shown as an overlay of a horizontally hashed and a vertically hashed rectangle) and the cropped video (shown as a transparent rectangle), and also indicates the roll angle.

The video is cropped to have the same output size that can be as big as possible while being entirely contained in the combined video regardless of roll angle. As an example, in case each sensor has 1920×1080 pixels, it can be possible to obtain a cropped video with 1331×748 pixels.

It will thus be appreciated that the present principles can be used to provide a device capable of, at least to a certain extent, compensate for how it is oriented when taking a picture or shooting video.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The invention claimed is:

1. A device comprising:
   a first sensor for capturing first image data corresponding to a first image, the at least one first sensor being rectangular;
   a second sensor for capturing second image data corresponding to a second image at least essentially orthogonal to the first image, the second sensor being rectangular and oriented to face a same direction as the first sensor relative to the device; and
   at least one hardware processor configured to:
      cause the first sensor and the second sensor to capture, respectively, the first image data and the second image data at least substantially simultaneously; and
      store together data from the first image data and data from the second image data as a cross-shaped image, wherein a first pair of opposite arms of the cross-shaped image originates from the first image data and a second pair of opposite arms of the cross-shaped image originates from the second image data.

2. The device of claim 1, further comprising a display configured to display the cross-shaped image.

3. The device of claim 1, wherein the at least one hardware processor is further configured to process at least one of the first image data and the second image data to remove redundancies between the first image data and the second image data.

4. The device of claim 3, wherein the at least one hardware processor is configured to remove redundancies by:
   rectifying the second image data to a referential to the first image data to obtain rectified second image data;
   resizing the rectified second image data to match a size of the first image data to obtain resized second image data; and
   removing parts of the resized second image data present in the first image data.

5. The device of claim 3, further comprising an angle measurement unit configured to measure a roll angle of the device;
   wherein the at least hardware processor is further configured to extract, from the first image data and the second image data and using the roll angle, image data corresponding to a rectangular image whose longer edge is parallel with the horizon.

6. The device of claim 5, wherein extracted image data, for at least some but not all roll angle values, includes image data from both the first image data and the second image data.

7. The device of claim 1, wherein the device further comprises memory configured to store together the data from the first image data and the data from the second image data.

8. The device of claim 1, wherein the at least one hardware processor is further configured to store the data from the first image data and the data from the second image data, captured in response to an instruction, in a single file.

9. The device of claim 1, wherein the first rectangular sensor and the second rectangular sensor have the same aspect ratio.

10. The device of claim 1, wherein the device is a smartphone or a tablet.

11. A method comprising:
   capturing at least substantially simultaneously first image data corresponding to a first image by a first sensor of a device and second image data corresponding to a second image at least essentially orthogonal to the first image by a second sensor of the device, the first sensor being rectangular, and the second sensor being rectangular and oriented to face a same direction as the at least one first sensor relative to the device; and
   storing together data from the first image data and data from the second image data as a cross-shaped image, wherein a first pair of opposite arms of the cross-shaped image originates from the first image data and a second pair of opposite arms of the cross-shaped image originates from the second image data.

12. The method of claim 11, further comprising processing, by at least one hardware processor, at least one of the first image data and the second image data to remove redundancies between the first image data and the second image data.

13. The method of claim 12, wherein the processing means removes redundancies by:
   rectifying the second image data to a referential to the first image data to obtain rectified second image data;

resizing the rectified second image data to match a size of the first image data to obtain resized second image data; and removing parts of the resized second image data present in the first image data.

14. The method of claim 11, further comprising storing the data from the first image data and the data from the second image data, captured in response to an instruction, in a single file.

15. A non-transitory computer readable medium storing program code instructions that, when executed by a processor, implement the steps of a method according to claim 11.

16. The device of claim 1, wherein the second sensor is arranged at least essentially orthogonal to the first sensor.

* * * * *